United States Patent [19]
Bekkering et al.

[11] Patent Number: 5,768,890
[45] Date of Patent: *Jun. 23, 1998

[54] EXHAUST AIR RAIL MANIFOLD

[75] Inventors: Mark W. Bekkering, Byron Center; Gary L. Wells, Kalamazoo, both of Mich.

[73] Assignee: Benteler Automotive Corporation

[ * ] Notice: The term of this patent shall not extend beyond the expiration date of Pat. No. 5,572,867.

[21] Appl. No.: 653,082

[22] Filed: May 21, 1996

Related U.S. Application Data

[63] Continuation-in-part of Ser. No. 366,465, Dec. 30, 1994, Pat. No. 5,572,867, which is a continuation-in-part of Ser. No. 151,556, Nov. 12, 1993, Pat. No. 5,349,817.

[51] Int. Cl.$^6$ ............................... F01N 3/34; F02F 1/42
[52] U.S. Cl. ............................................................. 60/305
[58] Field of Search ..................................... 60/305, 304

[56] References Cited

U.S. PATENT DOCUMENTS

| | | | |
|---|---|---|---|
| 3,438,198 | 4/1969 | Bentele | 60/305 |
| 3,444,687 | 5/1969 | Andersson | 60/305 |
| 3,468,124 | 9/1969 | Hraboweckyj | 60/305 |
| 3,522,702 | 8/1970 | Grosseau | 60/305 |
| 3,635,031 | 1/1972 | Haddad | 60/305 |
| 3,722,221 | 3/1973 | Chopin et al. | 60/305 |
| 3,948,229 | 4/1976 | Abthoff et al. | 60/305 |
| 3,965,678 | 6/1976 | Shiki | 60/305 |
| 4,372,112 | 2/1983 | Ackerman et al. | 60/305 |
| 4,630,439 | 12/1986 | Hudson, Jr. | 60/305 |
| 5,349,817 | 9/1994 | Bekkering | 60/322 |

FOREIGN PATENT DOCUMENTS 2259548  8/1973  Germany ................................ 60/305

*Primary Examiner*—Sheldon Richter
*Attorney, Agent, or Firm*—Price, Heneveld, Cooper, DeWitt and Litton

[57] ABSTRACT

A dual wall, air gap exhaust manifold with an integral inlet connecting flange defining an elongated, internal, air injection passageway enclosed by a configurated, convexly bulging cover plate welded over an elongated corner of the flange to form the elongated passageway, the configurated plate being welded over a series of short channels which extend between the elongated passageway and the manifold inlet openings. The elongated passageway has an air inlet connector.

2 Claims, 5 Drawing Sheets

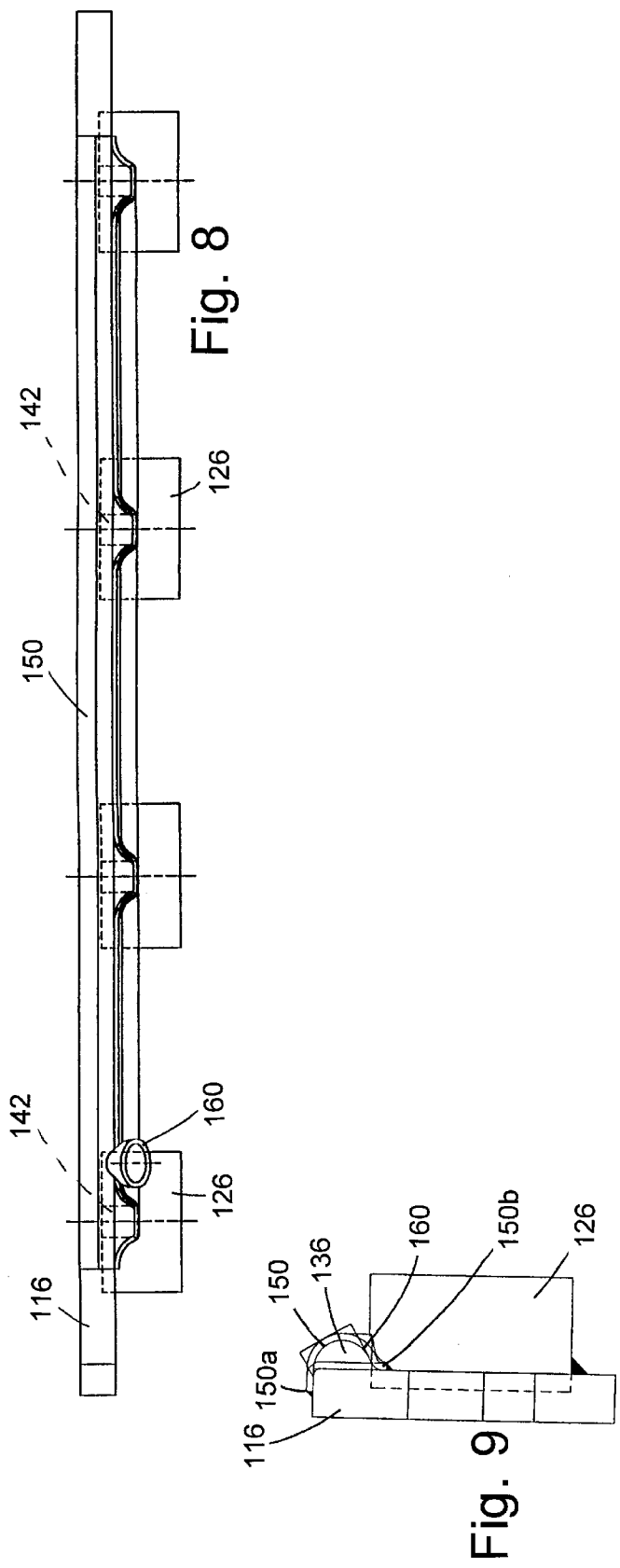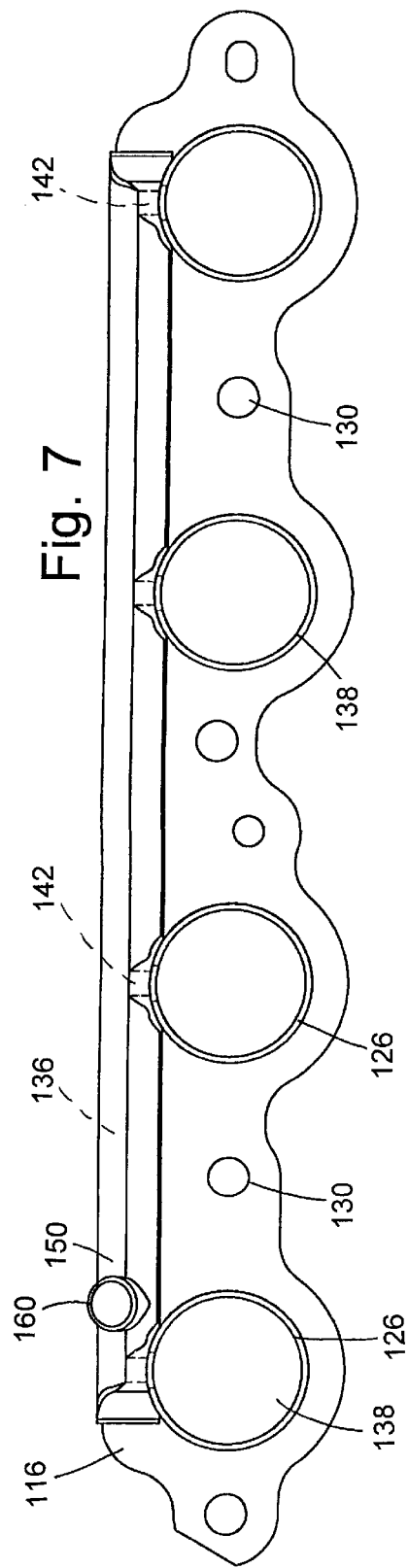

5,768,890

EXHAUST AIR RAIL MANIFOLD

RELATED APPLICATION

This application is a continuation-in-part application of application Ser. No. 08/366,465 filed Dec. 30, 1994, now U.S. Pat. No. 5,572,867 and entitled EXHAUST AIR RAIL MANIFOLD, which is a continuation-in-part of application Ser. No. 08/151,556 filed Nov. 12, 1993, now U.S. Pat. No. 5,349,817 and entitled AIR GAP MANIFOLD PORT FLANGE CONNECTION.

BACKGROUND OF THE INVENTION

This invention relates to exhaust gas manifolds for internal combustion engines, and particularly to a dual wall exhaust manifold having exothermic combustion in the manifold resulting from a special, relatively simple construction.

The technology of internal combustion engines has for some years included knowledge that post engine combustion in the exhaust manifold of remaining combustible components in the exhaust gases reduces pollution from the ultimate exhaust gas discharge. Unfortunately, special manifold arrangements for accomplishing this have been technologically complex and expensive, usually involving a "nest" of hoses and/or tubes to the system, a complex louvre system, or otherwise. The complexity not only involves an initial high cost, but also maintenance problems and expenses over the lifetime of the engine. The structure set forth in application U.S. Pat. No. 5,572,867 provided an effective but greatly simplified development. The structure set forth herein provides the effective results with further simplification.

SUMMARY OF THE INVENTION

The invention herein was developed subsequent to that in the parent application, for use with a dual wall, air gap exhaust manifold having an integral inlet connecting flange defining an elongated internal passageway enclosed by an elongated corner plate welded over an elongated edge of the flange to form the elongated passageway, the elongated corner plate also being welded over a series of short channels which extend between the elongated passageway and the manifold inlet openings. The elongated passageway has an air inlet connector. The walls of the manifold runners are joined at the flange openings, just downstream of the channels. The novel structure provides a relatively simple manifold flange capable of mass production, effective in operation, and free of a series of extraneous tubes and hoses.

These and several other features, objects and advantages of the invention will become apparent to those in the art upon studying the following specification in conjunction with the drawings.

BRIEF DESCRIPTION OF THE DRAWINGS

FIG. 7 is an elevational view of a second embodiment of the port flange;

FIG. 8 is a top view of the port flange in FIG. 7; and

FIG. 9 is an end view of the port flange in FIGS. 7 and 8.

DESCRIPTION OF THE PARENT EMBODIMENT

Figure 1:
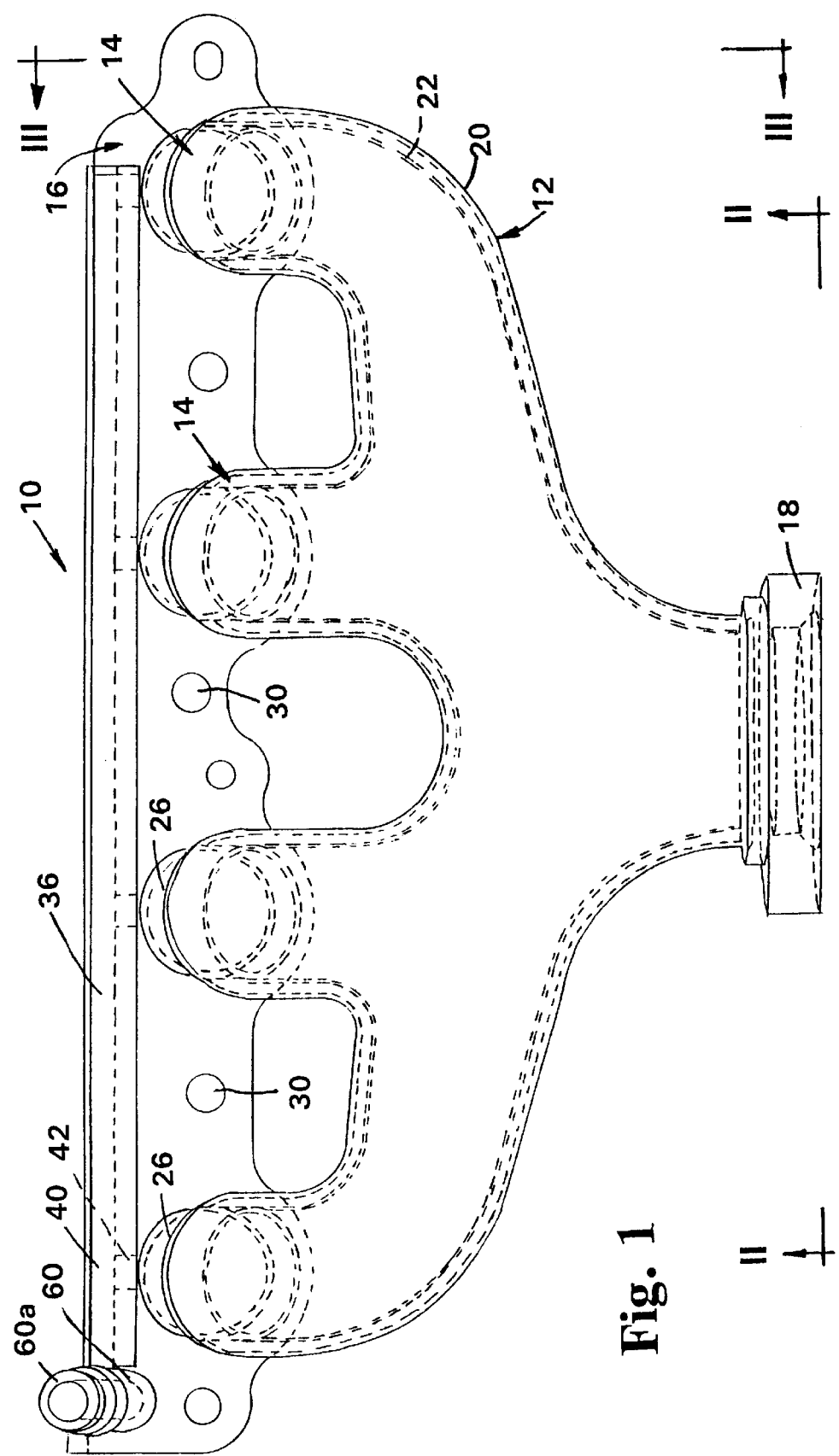
FIG. 1 is an elevational view of a vehicle engine exhaust manifold of the parent application.

The manifold assembly 10 comprises a main body 12 from which extend a plurality of spaced runners 14, an inlet connecting flange 16 for attachment of the manifold to an engine head or block, and an outlet or exhaust flange 18.

The body or, as it is commonly called, "log" 12 of the manifold is an elongated member in flow communication with each of the several runners, here shown to be four in number. The illustrated manifold can, for example, be for one bank of cylinders of a V—8 engine, there being a mirror image duplicate of this manifold on the opposite side of the engine.

Figure 2:
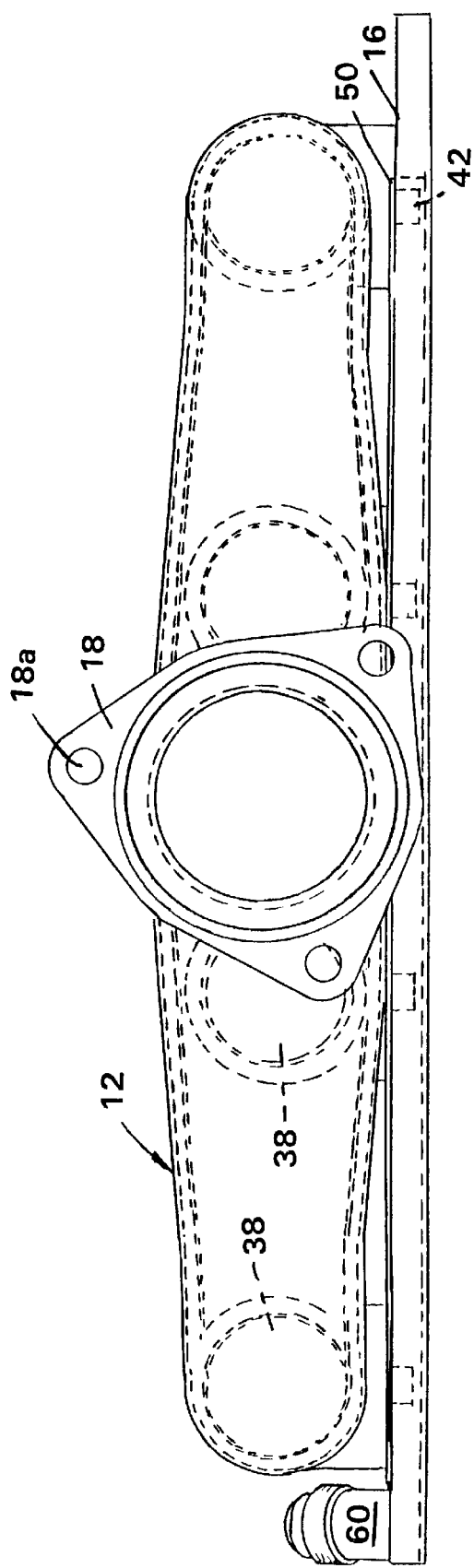
FIG. 2 is a view of the manifold in FIG. 1, from the direction II—II, i.e., toward the exhaust outlet of the manifold.
Figure 4:
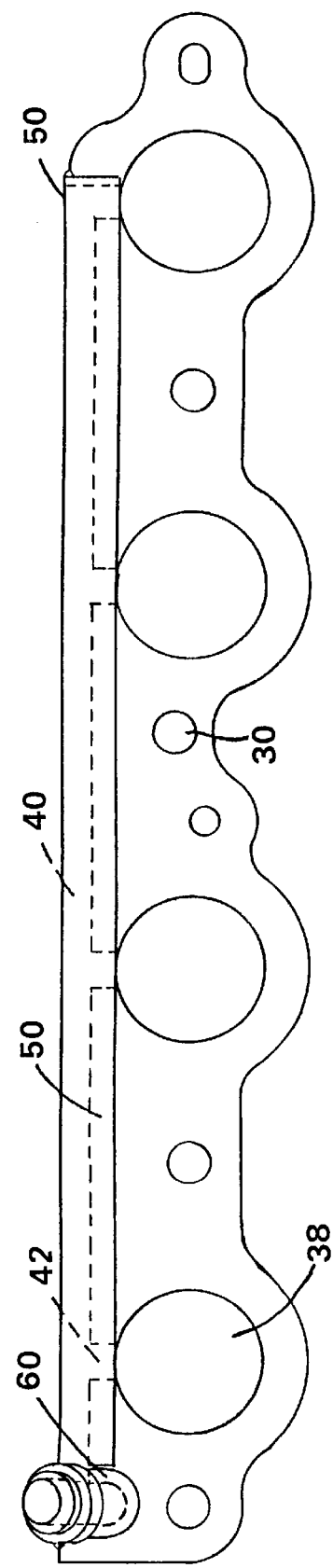
FIG. 4 is a fragmentary elevational view of the port flange in the manifold of FIGS. 1–3.
Figure 3:
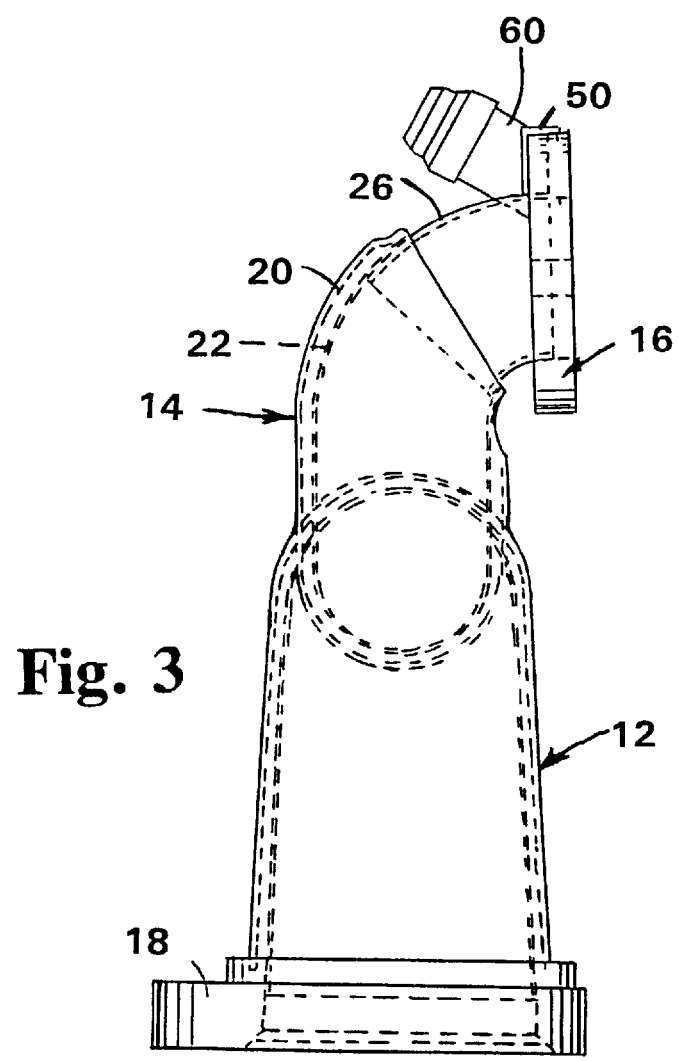
FIG. 3 is an end elevational view of the manifold in FIG. 1 taken from direction III—III.
Figure 5:
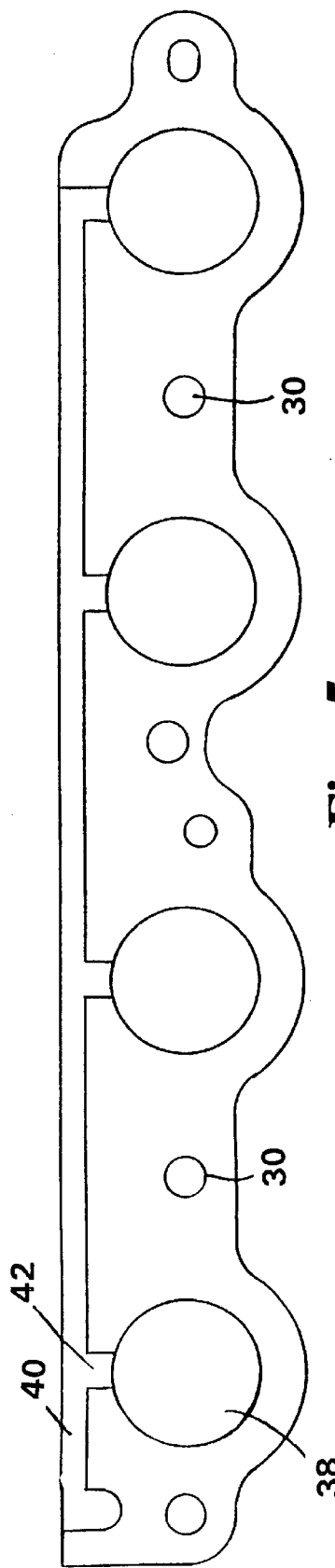
FIG. 5 is a fragmentary elevational view of the flange in FIG. 4, prior to attachment of the L-shaped cover plate.
Figure 6:
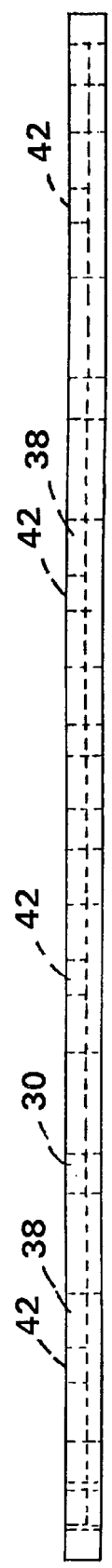
FIG. 6 is a bottom view of the flange in FIG. 5.

The log 12 includes an outer jacket 20 and an inner liner 22. The jacket and liner are spaced from each other preferably a controlled amount of several millimeters in width to form a dead air space serving as a heat insulator between the jacket and liner. The liner will typically be of less thickness than the jacket, both preferably being of stainless steel or other corrosion resistant material. Integrally extending from log 12 are the plurality of runners which continue the double wall construction, and are to receive exhaust gases from respective ones of the several engine cylinders. Connecting the individual runners to the inlet flange assembly 16 are individual sleeves 26 (FIGS. 1 and 3). The outlet end of each sleeve 26 is welded to the two engaging walls of jacket 20 and liner 22, while the inlet end of each sleeve 26 is welded to the peripheral wall of a corresponding through opening of connector plate 16. This sleeve arrangement is preferably made in accordance with the teachings in U.S. Pat. No. 5,349,817 issued Sep. 27, 1994, and entitled AIR GAP MANIFOLD PORT FLANGE CONNECTION, referred to above and incorporated by reference herein. As noted, jacket 20 and liner 22 are engaged with each other circumferentially where they are joined to sleeve 26. Likewise, the jacket and liner are engaged with each other where they join discharge flange 18. This flange 18 has suitable orifices 18a such as the three depicted in FIG. 2, for attachment to an exhaust pipe of conventional or air-gap type.

Inlet flange 16 is an elongated component of substantial thickness, having a plurality of bolt-receiving openings 30 (FIG. 1) at spaced intervals along its length for attachment to the engine. Shown along its upper edge is the special air injection structure to enable ambient air to be injected for oxidation purposes into the exhaust gases as they flow from the engine to the exhaust manifold assembly. More specifically, an elongated passageway 36 extends along the length of flange 16 to be adjacent to and overlap a the plurality of exhaust gas inlet openings 38 (FIG. 2). This passageway is formed by an elongated slot or channel 40 formed into the upper outer corner of flange 16 as by machining, casting or stamping, and terminating short of the opposite ends of the flange. A plurality of short channels 42, normal to channel 40, extend between elongated channel 40 and each of openings 38 so as to allow flow communication therebetween. Covering both elongated channel 40 and the plurality of short channels 42 is an elongated, L-shaped cover plate 50. The upper horizontal leg 50a of cover plate 50 extends over the top of channel 40 and is welded to the upper surface of connector plate 16. The vertical leg 50b of cover plate 50, which is normal to 50a, extends over the side of channel 40 as well as over short channels 42, and is welded to the side face of connector plate 16 as well as to the adjacent area of sleeves 26, thereby enclosing channels 40 and 42 from the ambient atmosphere. An air inlet conduit 60 having a threaded outer end 60a is welded to plate 16 at one end of passageway 36, so that oxygen-bearing air can be injected into passageway 36 and thus into the hot exhaust gases flowing through ports 38 into the exhaust manifold, where further combustion occurs, including conversion of carbon monoxide to carbon dioxide with the added oxygen, due to the maintained high temperature of the exhaust gas and the presence of the additional oxidizing gas, i.e., air. The combined heat of the exhaust gases flowing from the engine and the further combustion occurring in the exhaust manifold during start-up cause the inner liner 22 to rapidly heat to an elevated temperature while the outer jacket is thermally insulated by the air gap.

SECOND EMBODIMENT

Referring now specifically to FIGS. 7–9, the manifold flange 116 has a series of openings 130 for attachment of the flange and manifold to an engine block. The manifold itself is comparable to that in FIGS. 1–6, with a log and a plurality of runners therefrom. The individual runners are connected to the flange 116 by sleeves 126, the outer end of each sleeve being welded to the manifold jacket, as explained with respect to the earlier embodiment, and the inner end of each sleeve being welded to the inner peripheral wall of a corresponding through opening 138 of flange 116, preferably as set forth in U.S. Pat. No. 5,349,817.

Flange 116 is an elongated component of substantial thickness, having along its upper edge the special air injection structure to enable ambient air to be injected for oxidation purposes into the exhaust gases as they flow from the engine to the exhaust manifold assembly. More specifically, an elongated passageway 136 extends along the length of flange 116 to be adjacent to and overlap all of the plurality of exhaust gas flow openings 138. This passageway is formed by flange 116 and an elongated configured cover plate 150 which is somewhat L-shaped, having opposite edges which extend generally 90° relative to each other to engage the top and front surfaces of flange 116, while the central portion between these edges bulges convexly to project from and be spaced from the elongated covered corner of flange 116. This convexly bulging portion protrudes away from the flange and eliminates the need to machine a slot or channel in flange 116. The ends of cover plate are closed. A plurality of short channels 142 normal to passageway 136, extend between elongated passageway 136 and the respective openings 138 so as to allow air flow communication therebetween. The upper horizontal leg 150a of cover plate 150 extends over the top of flange 116 and is welded to this upper surface of flange 116. The vertical leg 150b of cover plate 150, which is normal to 150a, extends over a portion of the front face of passageway 136 as well as over short channels 142, and is welded to that face of flange 116 as well as preferably to the adjacent area of sleeves 126, thereby enclosing passageway 136 and channels 142 from the ambient atmosphere. An air inlet conduit 160 extends from cover plate 150 at one end of passageway 136, so that oxygen-bearing air can be injected into passageway 136 and channels 142, and thus into the hot exhaust gases flowing through ports 138 into the exhaust manifold where further combustion occurs including conversion of carbon monoxide to carbon dioxide with the added oxygen, due to the maintained high temperature of the exhaust gas and the presence of the additional oxidizing gas, i.e., air.

It is conceivable that certain minor variations may be made in the illustrated structure set forth as exemplary of the invention. Therefore, the invention is not intended to be limited to this specific embodiment, but only by the scope of the appended claims and the reasonably equivalent structures to those defined therein.

The embodiments of the invention in which an exclusive property or privilege is claimed are defined as follows:

1. An engine exhaust manifold flange comprising:

an elongated connecting flange having a plurality of gas flow openings therethrough, and having a plurality of sleeves at said openings, connected to said flange and extending from said openings for gas flow therethrough;

said elongated connecting flange having an elongated corner extending adjacent all of said sleeves; each of said sleeves having an opening therethrough;

an elongated configured cover plate extending along said elongated corner and said sleeves, having a pair of opposite elongated edges connected to said elongated connecting flange and having a central portion projecting from said elongated corner to form an elongated passageway;

an air inlet connector in flow-communication with said elongated passageway; and connecting channels between said passageway and said exhaust gas inlet openings, through said sleeves, whereby combustion air can be injected through said connector, said passageway and said connecting channels to said sleeves for chemical conversion of residual combustible components remaining in engine exhaust gases.

2. The engine exhaust manifold flange of claim 1 wherein said cover plate has a pair of opposite elongated edges, said edges extending generally 90° with respect to each other, one edge welded to the top surface of said flange and the other edge welded to the front surface of said flange, said cover plate between said edges having a convexly bulging configuration.

* * * * *

UNITED STATES PATENT AND TRADEMARK OFFICE
CERTIFICATE OF CORRECTION

PATENT NO. : 5,768,890
DATED : June 23, 1998
INVENTOR(S) : Mark W. Bekkering et al It is certified that error appears in the above-identified patent and that said Letters Patent is hereby corrected as shown below:

Column 2, line 45;
"18asuch" should be --18a such --;

Column 2, line 55;
"Delete "the";

Column 2, line 65;
"50aof" should be -- 50a of --;

Column 3, line 54;
"150aof" should be -- 15a of --;

Column 4, line 1;
"150bof" should be --150b of --.

Signed and Sealed this

Fifth Day of January, 1999

Attest:

Attesting Officer

*Acting Commissioner of Patents and Trademarks*